No. 789,937. PATENTED MAY 16, 1905.
G. T. REED.
RUBBER TIRE FASTENING FOR WHEELS.
APPLICATION FILED SEPT. 6, 1904.
2 SHEETS—SHEET 1.
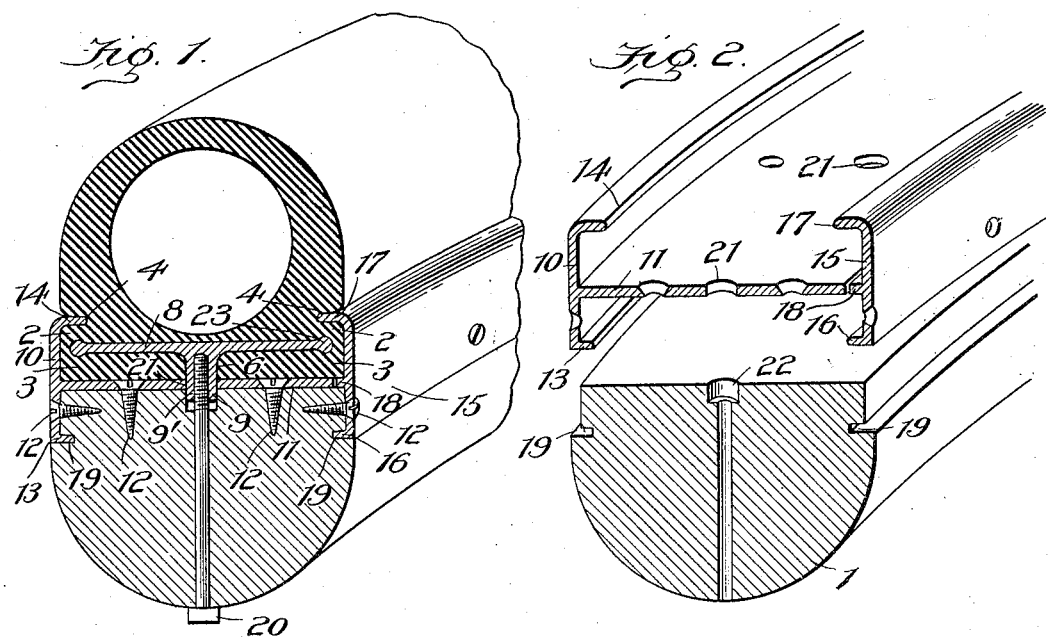
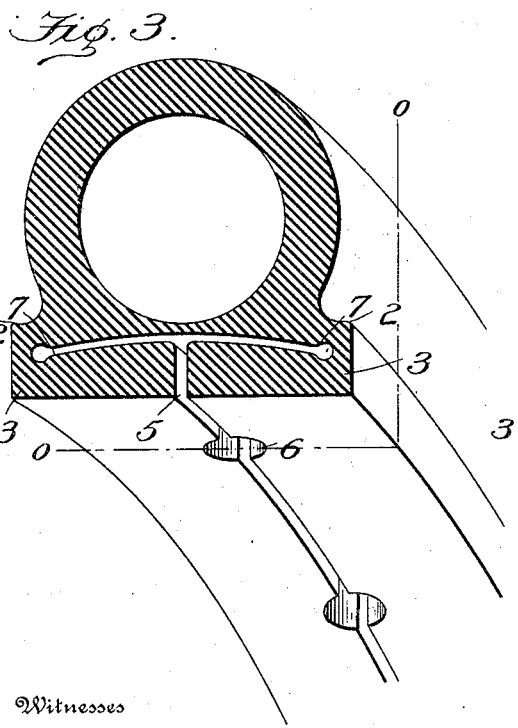
Witnesses
Edwin L. Bradford
Anne B. Johnson
Inventor
George Thorn Reed
By Johnson & Johnson
Attorneys No. 789,937. PATENTED MAY 16, 1905.
G. T. REED.
RUBBER TIRE FASTENING FOR WHEELS.
APPLICATION FILED SEPT. 6, 1904.

2 SHEETS—SHEET 2.

Witnesses
Edwin L. Bradford
Anne B. Johnson

Inventor
George Thorn Reed
By Johnson and Johnson
Attorneys

No. 789,937. Patented May 16, 1905.

UNITED STATES PATENT OFFICE.

GEORGE THORN REED, OF BALTIMORE, MARYLAND, ASSIGNOR OF ONE-THIRD TO ALBERT H. BEIMSCHLA, OF BALTIMORE, MARYLAND.

RUBBER-TIRE FASTENING FOR WHEELS.

SPECIFICATION forming part of Letters Patent No. 789,937, dated May 16, 1905.

Application filed September 6, 1904. Serial No. 223,463.

*To all whom it may concern:*

Be it known that I, GEORGE THORN REED, a citizen of the United States, residing at Baltimore city, State of Maryland, have invented certain new and useful Improvements in Rubber-Tire Fasteners for Wheels; and I do hereby declare the following to be a full, clear, and exact description of the invention, such as will enable others skilled in the art to which it appertains to make and use the same.

For supporting and fastening rubber tires to the rims of bicycle and automobile wheels I have produced a rubber tire having a base of novel construction and in combination therewith metallic connections by which the tire is secured to the rim, the object being to render it convenient and easy to mount the tire and then to safely secure it both radially and laterally in fixing the parts together and to the rim.

The accompanying drawings illustrate my invention in the form in which I prefer to use it; but it will be understood that my invention is not limited to the precise form and construction herein shown and described, as changes may be made without exceeding the scope of the invention or the claims in which it is set out.

Figure 5:
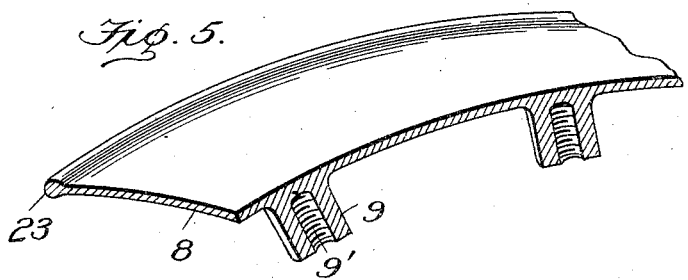
Figure 6:
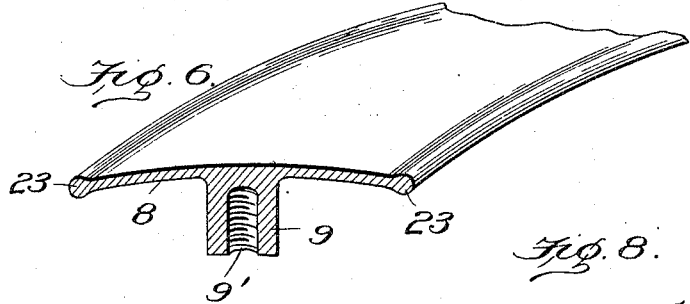
Figure 7:
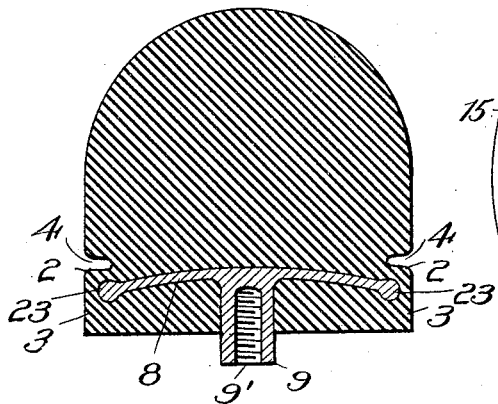
Figure 8:
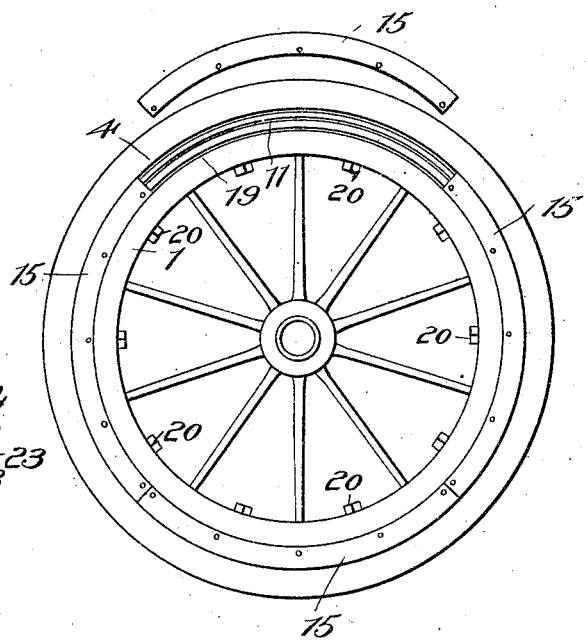

Referring to the drawings, Figure 1 shows in cross-section the rubber tire, the wheel-rim, and their connecting parts embodying my invention, a portion of the parts being extended in perspective. Fig. 2 shows in cross-section the rim and the separate channel-irons by which the rim and tire are secured together, the parts seen separated and a portion of them extended in perspective. Fig. 3 shows the rubber tire in cross-section and a portion extended in perspective, looking at its under side, to expose the form of the molded space in the base of the tire and enlarged openings intersecting the radial part of said space. Fig. 4 is a cross-section of the tire, taken through the line O of Fig. 3, showing the T-shaped opening in the base thereof. Fig. 5 shows a portion of one of the tire binder-plates and its screw-threaded bosses in longitudinal central section. Fig. 6 shows a cross-section of the same. Fig. 7 shows in cross-section a solid cushion rubber tire with the binder-plate and its screw-threaded boss molded therein and its screw-socket end projecting beyond the base. Fig. 8 shows a rubber-tired wheel embodying my invention.

The rim or felly 1 has a flat periphery and may otherwise be of any desired construction and material for a wheel.

The rubber tire is an unbroken circle, has a flat base, and may be of the pneumatic or solid cushion type. Its base on opposite sides is formed with shoulders 2 2, which may be formed by offsets or projections 3 3 or formed by grooves 4 4 in the sides of the tire. The base of the tire has molded therein a T-shaped space continuous with and opening at its flat base by a slot mediately of its width. The radial part or slot 5 of this base-space is intersected with enlarged openings 6, while the edges 7 7 of the horizontal part terminate beneath the side shoulders. A metal binder-plate 8 fits within the horizontal part of this base-space and is formed with bosses 9, which are provided with screw-threaded sockets 9', open at their inner ends. These bosses register with and project through and below the enlarged openings 6, which intersect the slot or radial part 5 of the base-space, while the edges of the binder-plate terminate under the base side shoulders 2 2. A channel-plate 10 is secured to the flat side of the rim or felly by a web 11, fastened by screws 12. The plate and its web are continuous with the rim, and both the plate and its web are secured to the wheel rim or felly by the screws 12 and by a channel-flange 13. The other channel-flange, 14, of the side plate 10 engages the shoulder or groove of the rubber tire. In this construction there are several important features, which are the bosses of the binder-plate projecting through openings in the web 11 of the channel-plate 10, its flange 13 engaging a groove in the side of the wheel-rim, and the other flange, 14, of said plate 10 overhanging the edge of the binder-plate. The web 11 of the channel-plate by its engagement with the boss of the binder-plate serves to brace the binder-plate and its tire against sidewise thrusts. The channel-flange 13 reinforces the fastening of the channel-web to the rim, while the overhanging relation of the channel-flanges 14 and 17 to the edges 23 of the binder-plate renders it impossible for the projection or offset 3 of the tire to be twisted or displaced by lateral thrusts from its engagement with the channel-flange. A separate channel-plate 15 is in segments and engages the wheel-rim by a flange 16 and engages the shoulder or groove of the rubber tire by a flange 17, while a mediate rib 18 of said plate rests on the rim, like the web 11. This channel-plate 15 is secured with a clamping function to the rubber tire and to the wheel-rim, with its tire-engaging channel-flange 17 overhanging the side edge of the binder-plate. The channel-plates are of ring form, and the engagement of each with a groove 19 in the side of the wheel-rim and the fastening-screws 12 gives a firm fastening for the channel-plates to the rim. Each binder-plate is formed with one or more screw-socketed bosses 9, which are engaged by screw-bolts 20 passing through bores in the rim, so that in driving these bolts they draw the binder-plate inward, and thereby bind and firmly secure the base of the tire within the channel-plates and upon the channel-web. To render it easy to screw the bolts into the binder-plate bosses, the wheel-rim is bored, preferably after the channel-web is secured to it, the holes in the web thereby serving to register with the rim-bores and with the boss screw-sockets which project through the web. These clamp-bolts are disposed, preferably, so as to be mediately between the wheel-spokes, and their engaging bosses are correspondingly disposed on the binder-plate. The making of the channel-plates in two separate ring parts allows the tire to be seated on the rim, with the binder-plate bosses inserted into the openings 21 in the web 11 of the channel-plate 10, which is first secured to the rim with its base shoulder or groove in engagement with the channel-flange 14, the other channel-plate being then clamped in place. I prefer to rabbet the upper side corners of the rim and to terminate the rabbets in grooves 19, as in Fig. 2, to give a firm seating for the channel-plates.

In Fig. 3 the tire is shown as having a T-shaped space opening at the bottom of the base, so as to permit one or both portions of the base to be turned out from the embedded space to allow the binder-plate to be forced into said space with the plate-bosses registering with the enlarged openings in the base and projecting therefrom into the web-opening. The tire is then forced in its seat on the web of the fixed channel-plate and the other channel-plate put in place and secured by screws. It is important to note that the screws which secure the channel-plates to the wheel-rim are relieved from strain by the embedding of the channel-flanges in the side grooves of the wheel-rim. Particularly is this important in the use of large pneumatic tires for automobiles, where there is considerable weight on the tires, and in passing over rough and uneven roads, and especially through deep and crooked ruts, and this security of the tire connections provides for such hard usage. I prefer to make the edges 23 of the binder-plate rounded to prevent cutting the rubber and to make the plate comparatively thin to allow it to have a slight spring, while at the same time stiffen the shoulders of the tire for the better hold of the channel-plates. The holes 21 in the web of the channel-plate for the bosses are preferably drilled, while the rim has corresponding recesses 22, extended a short distance into the rim to receive the bosses, which thereby serve as central braces to the tire and allow for the inward movement of the bosses in driving in the screw-bolts to fix the base of the tire securely within the channel-plates, as in Fig. 1.

The binder-plate may be made slightly arching, as in Fig. 6, to leave a thicker body of rubber around the bosses and to increase the binding function of the plate on the tire and the stiffening effect on the side shoulders. I prefer to mold the binder-plate integral with its bosses; but the binder-plate may be formed of sheet metal and the bosses secured to it.

An important feature of the tire construction, which allows a portion of the base to be readily turned outward for the insertion and removal of the binder-plate, is the mediate radial slot intersected by large openings at intervals around the base and which form finger-holds to take hold of and pull out the base. It is important also to note that the engagement of the bosses of the binder-plate with the rim or felly form central abutments bracing the tire against lateral thrusts, while the web of the channel-plate, being secured to the rim and pierced by the bosses, reinforces this central brace for the tire, the screws fastening the web to the rim being also relieved of lateral strain by the engagement of the bosses with the rim.

I have deemed it unnecessary to show the binder-plate as composed of a circle of segments or sections, but it will be understood that while these binder-plate sections are joined in the circle they are not connected to each other. The channel-web and its seating may be slightly concave and the base of the tire of corresponding form.

In Fig. 8 I have shown the channel-plate 15 as constructed in two or more segments, which is advantageous in allowing any one of them to be removed for any reason and for securing them in place.

As a new article of manufacture the tire can be furnished the trade in the form shown in Figs. 3 and 4 to receive the embedded binder-plate or in the form shown in Fig. 7, with the embedded binder-plate.

I claim—

1. A rubber tire for wheels having its base formed with side shoulders and an embedded T-shaped space, the radial part forming a slot opening at the bottom and intersected by enlarged openings at intervals around the base, in combination with binder-plates having screw-threaded bosses projecting through said openings, a wheel rim or felly, screw-bolts passing through the rim and engaging the binder-bosses, and means at the sides of the rim and tire for fastening them together.

2. A rubber tire for wheels having its base formed with side shoulders, and an embedded T-shaped space, the radial part forming a slot opening at the bottom and intersected by enlarged openings at intervals around the base, in combination with binder-plates having screw-threaded bosses projecting through said openings and below the base, a wheel rim or felly having recesses into which the bosses terminate, screw-bolts passing through the rim and engaging the binder-bosses, and channel-plates and means for securing them to the sides of the rim, and to the shoulders of the tire, one of said channel-plates having a web secured to the rim and pierced by the said bosses.

3. A rubber tire having its base formed with a T-shaped embedded space the radial part of which forms a bottom continuous slot, binder-plates within said space, each plate having screw-bosses projecting through said slot, a wheel-rim, channel-plates one of which has an integral web secured to said rim, the said screw-bosses passing through and engaging said channel-web, and screw-bolts passing through the rim and engaging said bosses, whereby the said binder-plates and the said channel-web are secured together, to the rim and to the tire.

4. A fastening for rubber tires for wheels, consisting of binder-plates embedded in the base of the tire and having screw-threaded bosses projecting through and beyond the base, the wheel rim or felly, screw-bolts passing through the rim and engaging the bosses, channel-plates, each having a flange engaging the side shoulders of the tire and also a groove in each side of the rim, one of said channel-plates having a web pierced by the said bosses, said binder-plate at each edge terminating in the tire-shoulder under the channel-flanges, and the web and the channel-plate secured to the rim.

5. A fastening for rubber tires for wheels, consisting of binder-plates embedded in the base of the tire, a wheel rim or felly on which the tire is seated, means for clamping and securing the binder-plate to the rim consisting of screw-bolts, and means at each side for securing the rim and the tire together consisting of channel-plates one of which has a web engaging said binder-plates.

6. A rubber tire having side shoulders, binder-plates embedded in the base of the tire and having screw-threaded bosses projecting through and beyond the base, the rim or felly, screw-bolts passing through said wheel-rim and engaging the bosses, and channel-plates each having a flange engaging the side shoulders of the tire, the edges of the said binder-plate terminating within the tire-shoulders under the channel-flanges.

7. In combination with a rubber tire, a rim or felly, binder-plates embedded in the base of the tire and having screw-threaded bosses projecting through and beyond the base and engaging said rim, and screw-bolts passing through the rim and engaging said binder bosses, the base of the tire being yieldingly clamped to said rim, and side channel-plates for securing the tire and rim together.

8. A rubber tire for wheels having its base formed with side shoulders, in combination with binder-plates embedded in said base and having screw-threaded bosses projecting through said base, a wheel rim or felly, screw-bolts engaging said bosses, and channel-plates and means for securing them to the sides of the rim and to the shoulders of the tire, one of said channel-plates having a web secured to the rim and pierced by the bosses, the other of said channel-plates constructed of segments and securing the rim and the tire together.

9. In combination with a rubber tire, binder-plates embedded in the base of the tire and having inward-projecting bosses, side channel-plates securing the rim and the tire together, one of said channel-plates having a web secured to the rim and said bosses passing through said web into corresponding recesses in the rim, and screw-bolts passing through the rim and engaging the bosses.

10. As a new article of manufacture a rubber tire for wheels having a base formed with an embedded T-shaped space, the radial part of which being a continuous bottom slot, and binder-plates in sections within said space, each section having screw-bosses projecting through said slot and beyond the base of the tire.

11. As a new article of manufacture, a rubber tire for wheels having a base formed with side shoulders, a binder-plate embedded in said base and having screw-threaded bosses projecting at intervals through said base, the side edges of said binder-plate terminating within said base-shoulders.

12. In combination with a rubber tire having its base formed with a T-shaped space the radial part of which is a continuous bottom slot, binder-plates in abutting sections within said space, each plate having screw-bosses projecting through said slot, a wheel-rim, channel-plates one of which is an unbroken ring and has an integral web secured to said rim, the other channel-plate of segments, the said screw-bosses passing through and engaging the said channel-web, and screw-bolts engaging the screw-bosses, whereby the web of the unbroken channel-ring is fastened to each sectional binder-plate.

In testimony whereof I have signed my name to this specification in the presence of two subscribing witnesses.

GEORGE THORN REED.

Witnesses:
    HORACE S. WHITMAN,
    JAMES JENKINS.